(12) United States Patent
Bhaatia

(10) Patent No.: US 7,348,370 B2
(45) Date of Patent: Mar. 25, 2008

(54) METAL OXIDES AND HYDROXIDES AS CORROSION INHIBITOR PIGMENTS FOR A CHROMATE-FREE CORROSION RESISTANT EPOXY PRIMER

(75) Inventor: Promila P. Bhaatia, Farmington, CT (US)

(73) Assignee: United Technologies Corporation, Hartford, CT (US)

( * ) Notice: Subject to any disclaimer, the term of this patent is extended or adjusted under 35 U.S.C. 154(b) by 366 days.

(21) Appl. No.: 11/117,598

(22) Filed: Apr. 27, 2005

(65) Prior Publication Data

US 2006/0247335 A1 Nov. 2, 2006

(51) Int. Cl.
*C08L 63/00* (2006.01)
*C08K 3/10* (2006.01)
*B32B 27/38* (2006.01)

(52) U.S. Cl. .................. 523/459; 523/457; 428/414

(58) Field of Classification Search ................. 428/413, 428/414, 416, 418; 523/457, 458, 459
See application file for complete search history.

(56) References Cited

U.S. PATENT DOCUMENTS

| 5,260,357 A | 11/1993 | Sachdeva |
| 5,266,611 A | 11/1993 | Teschendorf |
| 5,641,818 A * | 6/1997 | Sweet .................. 523/404 |
| 6,190,780 B1 | 2/2001 | Shoji et al. |
| 2004/0104378 A1 | 6/2004 | Bhatia |
| 2004/0249043 A1* | 12/2004 | Stoffer et al. ............... 524/430 |

FOREIGN PATENT DOCUMENTS

| DE | 195 15 234 | 10/1996 |
| EP | 0 696 624 | 2/1996 |
| EP | 1 493 846 | 1/2005 |
| GB | 2 091 235 | 7/1982 |
| JP | 02-021970 | 1/1990 |
| RU | 2 088 621 | 8/1997 |

OTHER PUBLICATIONS

Database WPI Section CH, Week 198233, Derwent Publications Ltd., London, GB; Class A82, AN 1982-69024E, XP-002392713.
Chemical Abstracts 142:136601 & Hughes et al., ATB Metallurgie (2003), 43 (1-2), pp. 254-272. See abstract. This citation discloses the use of cerium oxide in anti-corrosive primers.
Chemical Abstracts 138:155051 & Proc. Int. Waterborne, High-Solids and Power Coatings Symp. (2002) 29th, pp. 371-382. See abstract. This citation discloses the use of cerium oxide in anti-corrosive primers.
Chemical Abstracts 132:23865 & Progress in Organic Coatings (1999), 36(4), pp. 211-216. See abstract. This citation discloses the use of zinc oxide in anti-corrosive primers.

* cited by examiner

*Primary Examiner*—Michael J Feely
(74) *Attorney, Agent, or Firm*—Bachman & LaPointe, P.C.

(57) ABSTRACT

A corrosion resistant epoxy primer comprises a epoxy resin, a curing agent, and a non-chromate containing corrosion-inhibiting pigment.

14 Claims, No Drawings

METAL OXIDES AND HYDROXIDES AS CORROSION INHIBITOR PIGMENTS FOR A CHROMATE-FREE CORROSION RESISTANT EPOXY PRIMER

BACKGROUND OF THE INVENTION

The present invention relates to a corrosion resistant primer and, more particularly, an epoxy corrosion resistant primer which is free of hexavalent chromium compounds.

Structural alloys, including alloys of aluminum, steel, etc., are commonly used in aerospace, marine, auto and other applications. Generally, these alloys are protected against corrosion by applying primers or organic coatings containing corrosion inhibitors. Typically, the corrosion resistant primers used for the structural alloys are solvent based epoxy primers which employ hexavalent chromium as an active corrosion inhibitor pigment additive. These primers rely on the hexavalent chromium for corrosion protection. All forms of hexavalent chromium are recognized by the United States National Institute of Environmental Health Sciences as a Group I known human carcinogen. In addition, again with the enactment of federal and state legislation to reduce hexavalent chromium volatile organic content (VOC) levels in paints and primers, considerable attention has been given to waterborne, solvent-borne, and/or water-reducible resin binders. Accordingly, the use of corrosion inhibiting compounds which contain forms of hexavalent chromium are subject to stringent regulation and control. It would be very beneficial to eliminate hexavalent chromium as a corrosion inhibiting additive to such primers.

Accordingly, it is the principle object of the present invention to provide a corrosion resistant primer which is free of hexavalent chromium.

It is a particular object of the present invention to provide an epoxy corrosion resistant primer as set forth above which is effective in preventing attack on structural metal alloys.

It is a still further object of the present invention to provide a corrosion inhibiting epoxy primer as set forth above which is effective against both general corrosion and pitting corrosion.

Further objects and advantages of the present invention will appear hereinbelow.

SUMMARY OF THE INVENTION

In accordance with the present invention the foregoing objects and advantages are readily obtained.

The present invention is drawn to an epoxy corrosion resistant primer comprising an epoxy, a curing agent, and a non-chromate corrosion inhibiting pigment. In accordance with the present invention, the non-chromate corrosion inhibiting pigment comprises a non-chromate corrosion inhibiting pigment additive in combination with other pigment extenders and the like. The non-chromate corrosion inhibiting pigment additive is selected from the group consisting of heavy metal oxides and heavy metal hydroxides and, preferably, is selected from the group of oxides of Mo, Ce, hydroxides of Mo, Ce, and mixtures thereof. It is preferred that the non-chromate corrosion inhibiting pigment additive comprises a heavy metal oxide and a heavy metal hydroxide. The particularly preferred non-chromate corrosion inhibiting primer additives are selected from the group consisting of molytrioxide, ceric hydroxide and mixtures thereof.

DETAILED DESCRIPTION

The present invention is drawn to a chromate free epoxy resin corrosion resistant primer comprising an epoxy resin, a curing agent, and a non-chromate corrosion inhibiting additive. The epoxy resin is preferably either a waterborne epoxy resin or a solvent-borne epoxy resin.

In accordance with the present invention, the non-chromate corrosion inhibiting pigment comprises (1) a non-chromate corrosion inhibiting additive selected from the group consisting of oxides of Mo, Ce, hydroxides of Mo, Ce, and mixtures thereof and (2) extender pigments selected from the group consisting of titanium dioxide, clay or aluminum silicate, calcium carbonate, talc or magnesium silicate, zinc oxide, and barytes or barium sulfate. The non-chromate corrosion inhibiting pigment (that is, the total pigment composition which includes the non-chromate corrosion-inhibiting additive and extender pigments) is present in an amount of between 25 to 60 wt. %, preferably 40 to 55 wt. %, with respect to the final primer composition. It is preferred in the present invention that the ratio of Ce to Mo in the pigment is between 0.5:1 to 2.5:1, preferably between 0.6:1 to 1.5:1. The non-chromate corrosion inhibiting additive comprises between 10 to 50 wt. %, preferably 20 to 45 wt. %, with respect to the total pigment composition. In order for the corrosion inhibiting additive to have the desired solubility typically required in the pigment for the epoxy primer, it is preferred that the corrosion inhibiting additive comprises an oxide and a hydroxide of the heavy metal. The most preferred corrosion inhibiting additive comprises molytrioxide and ceric hydroxide.

In accordance with the present invention, the epoxy is preferably a waterborne or solvent-borne epoxy resin wherein the epoxy corrosion resistant primer comprises an epoxy selected from the group consisting of a non-volatile dispersion of diglycidyl ether bisphenol A modified epoxies having weight per epoxide (WPE) value between 450-700 and viscosity between 12000-19000 cps. In one embodiment of the present invention, the dispersion is based on a medium molecular weight wherein the dispersion is based on a polyfunctional resin dispersion, which on curing forms a high crosslink density polymer having very good hardness and resistance. In a further embodiment, the dispersion is based on an aqueous dispersion of a semi-solid standard bisphenol A epoxy resin of high molecular weight epoxy resin. The epoxy is present in an amount of 5 to 50 wt. %, preferably between 15 to 30 wt. % with respect to the final primer composition.

In accordance with the present invention, in case of waterborne epoxy formulations, the curing agent is selected from the group consisting of waterborne or water-reducible modified amine or polyamidoamine adducts having amine value between 300-450. In a preferred embodiment of the present invention, the curing agent further includes a hydrophobic curing agent to impact water in corrosion resistance. The curing agent is present in an amount of between 2 to 20 wt. %, preferably 5 to 15 wt. %, with respect to the final primer composition.

In accordance with the further preferred embodiment of the present invention, in the case of solvent-borne epoxy formulations, epoxy resin solution comprises of diglycidyl ether bisphenol A resin and curing agents include polyamines or polyamidoamine. Suitable solvent-borne epoxy resins are available from Akzo Nobel and Deft.

The chromate free epoxy corrosion resistant primer of the present invention is particularly useful in preventing general corrosion and pitting corrosion on metal substrates, particularly, alloys of aluminum, alloys of steel, stainless steels, high strength stainless steel alloys, galvanized steel, and the like. The use of the chromate free waterborne epoxy of the present invention is useful in all industries including the aerospace industry, automotive industry, architectural industry, packaging industry, electronics industry, HBAC and marine.

The corrosion inhibiting properties of the chromate free epoxy corrosion resistant primer of the present invention will be made clear from the following example.

EXAMPLE

Five epoxy primer compositions were prepared as shown in Table 1. Aluminum surfaces were used to evaluate the corrosion properties of these primers. The aluminum surfaces were either blasted prior or pretreated with trichrome conversion coating before application of the primers. The test coupons were exposed to salt spray tests as per ASTM B117. The coupons were then evaluated for signs of corrosion and pitting and compared to benchmark strontium chromate based epoxy primers in accordance with MIL-H-85582. The corrosion resistant properties of the epoxy primers in accordance with the present invention were evaluated with respect to the chromate containing primers. While the corrosion inhibitive properties of the candidate primers did not exhibit corrosion inhibitive properties equivalent to the chromate containing primers, the primers did exhibit corrosion inhibitive properties without constituting a health risk.

TABLE I

Waterborne Epoxy Primers

| Primer # | % PVC | Components | Weight, gms |
|---|---|---|---|
| Primer 1 | 25 | Epoxy resin ready uninhibited solventborne primer resin solution | 123.00 |
| | | Ceric hydroxide | 15.26 |
| | | Molytrioxide | 27.86 |
| Primer 2 | 25 | Epoxy resin ready uninhibited solventborne primer resin solution | 127.00 |
| | | Ceric hydroxide | 15.30 |
| | | Molywhite 101, Zinc molybdate | 30.50 |
| Primer 3 | 30 | Epoxy resin ready uninhibited solventborne primer resin solution | 128.50 |
| | | Ceric hydroxide | 15.25 |
| | | Molytrioxide | 14.00 |
| | | Calcium ion exchanged amorphous silica gel-basic pigment | 5.50 |
| Primer 4 | 35 | Epoxy resin, waterborne resin | 60.00 |
| | | Ceric hydroxide | 76.50 |
| | | Molytrioxide | 46.92 |
| | | Titanium oxide | 85.20 |
| | | Propylene glycol phenyl ether | 6.50 |
| | | 4-Hydroxy-4-methyl-2-pentanone | 25.00 |
| | | DI water | 75.00 |
| Primer 5 | 35 | Epoxy resin, waterborne resin | 63.00 |
| | | Ceric hydroxide | 76.50 |
| | | Molytrioxide | 46.92 |
| | | Titanium oxide | 42.60 |
| | | Calcium ion exchanged amorphous silica gel-basic pigment | 12.60 |
| | | Propylene glycol phenyl ether | 6.50 |
| | | 4-Hydroxy-4-methyl-2-pentanone | 25.00 |
| | | Triton wetting agent or surfactant | 0.50 |
| | | DI water | 75.00 |

It is apparent that there has been provided in accordance with the present invention a chromate-free corrosion resistant epoxy primer which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. An epoxy corrosion resistant primer comprising:
    an epoxy resin;
    a curing agent; and
    a non-chromate containing corrosion inhibiting pigment; wherein the non-chromate corrosion inhibiting pigment comprises extender pigments and a non-chromate corrosion inhibiting additive, wherein the non-chromate corrosion inhibiting additive comprises (1) an oxide of at least one of Mo and Ce, and (2) a hydroxide of at least one of Mo and Ce, wherein the ratio of Ce to Mo in the non-chromate containing corrosion inhibiting pigment is between 0.5:1 to 2.5:1.

2. A primer according to claim 1 wherein the epoxy resin is selected from the group consisting of a non-volatile dispersion of diglycidyl ether bisphenol A modified epoxies having weight per epoxide (WPE) value between 450-700 and viscosity between 12000-19000 cps.

3. A primer according to claim 2 wherein said epoxy is present in an amount of between 5 to 50 wt. % with respect to the final primer composition.

4. A primer according to claim 2 wherein said epoxy is present in an amount of between 15 to 30 wt. % with respect to the final primer composition.

5. A primer according to claim 2 wherein the curing agent is selected from the group consisting of: waterborne or water-reducible modified amine having an amine value between 300-450, and waterborne or water-reducible polyamidoamine adduct having an amine value between 300-450.

6. A primer according to claim 5 wherein the curing agent further includes a hydrophobic curing agent for enhanced water and corrosion resistance.

7. A primer according to claim 5 wherein said curing agent is present in an amount of between 2 to 20 wt. % with respect to the final primer composition.

8. A primer according to claim 5 wherein said curing agent is present in an amount of between 5 to 15 wt. % with respect to the final primer composition.

9. A primer according to claim 1 wherein the non-chromate corrosion inhibiting additive comprises a mixture of molytrioxide and ceric hydroxide.

10. A primer according to claim 1 wherein the non-chromate corrosion inhibiting additive is present in an amount of between 10 to 50 wt. % with respect to the total non-chromate containing corrosion inhibiting pigment.

11. A primer according to claim 1 wherein the non-chromate corrosion inhibiting additive is present in an amount of between 20 to 45 wt. % with respect to the total non-chromate containing corrosion inhibiting pigment.

12. A primer according to claim 1 wherein the non-chromate corrosion inhibiting pigment is present in an amount of between 25 to 60 wt. % with respect to the final primer composition.

13. A primer according to claim 1 wherein the non-chromate corrosion inhibiting pigment is present in an amount of between 40 to 55 wt. % with respect to the final primer composition.

14. A primer according to claim 1, wherein the ratio of Ce to Mo in the non-chromate containing corrosion inhibiting pigment is between 0.6:1 to 1.5:1.

* * * * *